Figure 1:
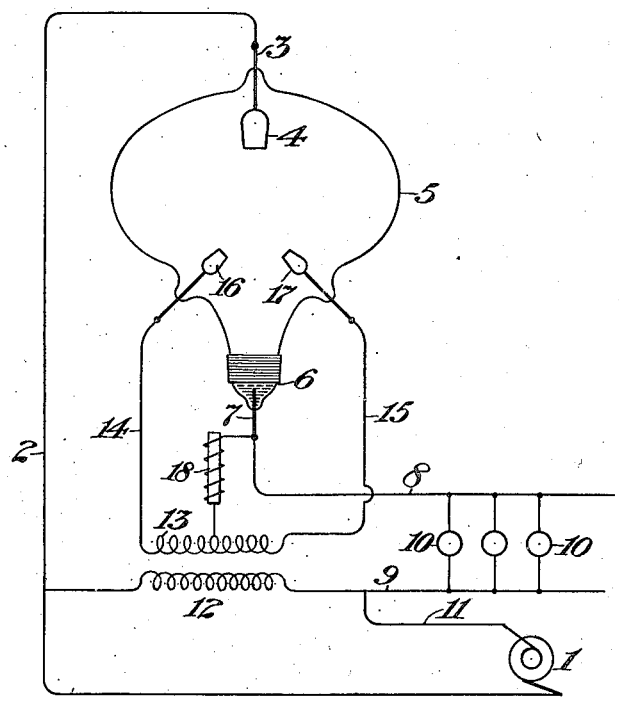

P. H. THOMAS.
ELECTRICAL DISTRIBUTION SYSTEM.
APPLICATION FILED SEPT. 4, 1903.

1,110,583.

Patented Sept. 15, 1914.
3 SHEETS—SHEET 1.

Witnesses
Chas. F. Clagett
George H. Stockridge

Inventor
Percy H. Thomas
By his Attorney
Charles A. Terry

P. H. THOMAS.
ELECTRICAL DISTRIBUTION SYSTEM.
APPLICATION FILED SEPT. 4, 1903.

1,110,583.

Patented Sept. 15, 1914.
3 SHEETS—SHEET 3.

Witnesses
Chas. F. Clagett
George H. Stocks Jr.

Inventor
Percy H. Thomas.
By his Attorney
Charles A. Terry

UNITED STATES PATENT OFFICE.

PERCY H. THOMAS, OF PITTSBURGH, PENNSYLVANIA, ASSIGNOR, BY MESNE ASSIGNMENTS, TO COOPER HEWITT ELECTRIC COMPANY, OF HOBOKEN, NEW JERSEY, A CORPORATION OF NEW JERSEY.

ELECTRICAL DISTRIBUTION SYSTEM.

1,110,583. Specification of Letters Patent. Patented Sept. 15, 1914.

Application filed September 4, 1903. Serial No. 171,881.

*To all whom it may concern:*

Be it known that I, PERCY H. THOMAS, a citizen of the United States, and resident of Pittsburgh, county of Allegheny, State of Pennsylvania, have invented certain new and useful Improvements in Electrical Distribution Systems, of which the following is a specification.

In an application filed June 13, 1903, and bearing the Serial Number 161,282, I have described an organization of circuits and apparatus whereby a gas or vapor electric device may be maintained in operation from an alternating current source by providing means for maintaining the negative electrode in an operative condition by means of an auxiliary transformer connected in one of its embodiments by its outside terminals to two positive electrodes and by a lead from an intermediate point through a choke coil to the negative electrode.

It is known that devices of the character here indicated have an initial high reluctance at the negative electrode which can be broken down by a current of the proper potential, but which reëstablishes itself as soon as current ceases to flow in the same direction to the electrode. By the phrase "maintaining the negative electrode in an operative condition", as used above, I refer to this characteristic of vapor devices, and mean that current is caused to flow to the negative electrode in the same direction, thereby preventing the reëstablishment of the original negative electrode reluctance. Naturally, in supplying currents from an alternating current source to a device of this character, the negative electrode reluctance would reëstablish itself at the first alternation, and it is for this reason that means are provided for maintaining the negative electrode in operative condition as, for example, by the method described in my application above referred to.

In the present application, it is the purpose to describe a system of circuits and apparatus whereby comparatively large quantities of energy can be supplied, as demanded, to a work circuit without the necessity of starting the device after the close of any interval of supply. In this instance, the particular character of the gas or vapor device is that of a converter occupying an intermediate place between the supply and the work circuit and serving to change alternating into direct currents in the latter circuit.

The results thus indicated may be accomplished by maintaining the negative electrode in operative condition by means independent of the main supply circuit. The independent means may consist of a source of current having one or more positive electrodes within the vapor device and connected with the negative electrode through an inductance, the negative electrode being common to currents derived from the main source of supply and currents derived from the independent source.

By virtue of the organization herein disclosed, current will pass from the independent source through the negative electrode by way of the additional positive electrode or electrodes. In this manner the negative electrode will be maintained in operative condition at all times and currents of the proper direction from the main supply circuit will pass through the vapor device to supply the work circuit. It may be convenient at times to obtain the energy for the independent source through any well-known means from the original source of energy, preferably without electrical connection between the independent source and the main source of energy.

In using the term "independent source" in this specification, I mean a source which may or may not derive its energy from the main source of supply, but which is independent in the sense that there is no electrical connection between it and the main source.

It will be understood that the inductance above referred to may occupy any position in the system where it will accomplish the purpose of assisting in keeping the negative electrode operative at all times.

My invention is illustrated in the accompanying drawings, in which—

Figures 1, 2, 3, 4 and 5, are diagrams representing different organizations of circuits and devices adapted to the carrying out of my invention.

Referring to the first figure of the drawings, 1 is a source of energy, here represented as a single phase alternating current generator. From one side of the generator a conductor, 2, extends to a leading-in wire, 3, which is connected with a positive electrode, 4, inside the vapor converter, 5. The negative electrode of the converter is shown at 6. This electrode may conveniently be a small mass of mercury. To the electrode 6 is connected a leading-in wire, 7, from which extends one of the wires, 8, of a work circuit, the other wire being shown at 9. Between the mains of the work circuit I may place any suitable direct current translating devices, 10, 10.

The opposite side of the generator 1 is connected by a wire, 11, with one side of the work circuit, as 9, and also through the primary, 12, of a transformer, the said primary being, accordingly, connected directly across the terminals of the generator. The secondary, 13, of the transformer has its two terminals connected by wires, 14 and 15, with supplementary or additional positive electrodes, 16 and 17, respectively. From an intermediate point in the coils of the secondary, 13, a conductor extends to the leading-in wire 7 and includes an inductance device or choke coil, 18, as shown.

The secondary thus becomes an independent source which is connected with additional or supplementary positive electrodes in the converter and is also connected at an intermediate point to the negative electrode. Accordingly, impulses set up in the secondary will act alternately upon the converter or a portion thereof, and through the effect of the inductance device, 18, the energy stored during a rise of potential will be discharged during a fall of potential and the negative electrode will then be maintained in operative condition. In other words, the secondary 13 will pass current through a portion of the converter first by way of one of the supplementary positive electrodes, as 16, then by way of the other positive electrode, as 17, then again by way of the electrode 16, and so on. Inasmuch as the periods of the supply from the two electrodes overlap each other, current does not, at any time, cease to flow in the proper direction to and through the negative electrode 6. In this way, the work circuit 8, 9 is supplied with currents of uniform direction, such currents being intermittent in the organization illustrated in Fig. 1. That is to say, currents of one direction only pass through the converter 5 from the main positive electrode 4 to the negative electrode 6. By reason of the fact that through the action of the independent source, the negative electrode 6 is maintained operative, there will always be in the converter a condition permitting the passage of current from the main positive electrode 4 to the negative electrode 6.

Figure 2:
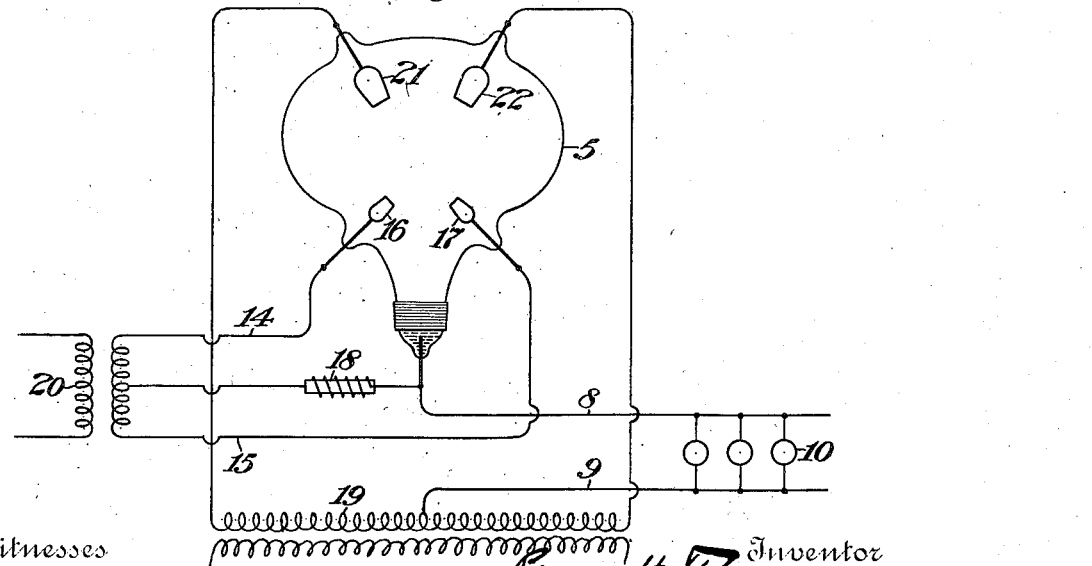

In Fig. 2 the source is represented as the secondary, 19, of a transformer, the same being assumed to be properly connected with a primary supplied by a source of alternating currents. It is manifest that any suitable alternating source may be substituted for the secondary 19. In this instance I supply the auxiliary positive electrodes from a source which does not, in any sense, derive its energy from the main source of supply. For example, a transformer, 20, is utilized for this purpose, its leads, 14 and 15, being connected, respectively, with the supplementary positive electrodes 16 and 17. The choke coil 18 is connected, as before, to the leading-in wire 7, and it is also connected to an intermediate point of the secondary 20. The wire 9 of the work circuit is here connected with an intermediate point of the source 19, the extremities of which are joined to two main positive electrodes, 21 and 22, in the converter 5. With this organization, currents from both directions from the source pass through the converter and are delivered to the work circuit.

Figure 3:
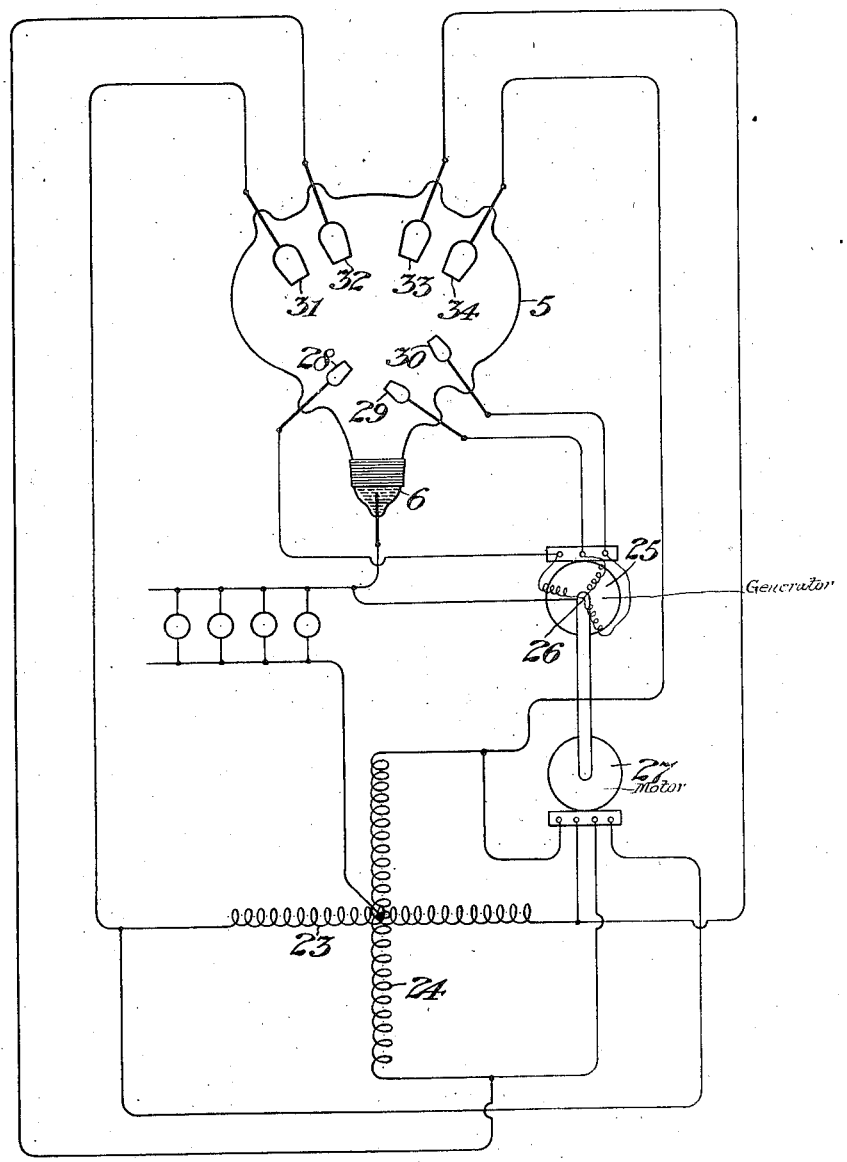

In the organization illustrated in Fig. 3, a quarter phase generator, here illustrated by two transformers, 23 and 24, supplying current at ninety degrees and interconnected at their middle points, supplies energy to the work circuit through the vapor converter 5. The negative electrode 6 is maintained in operative condition by means of currents obtained from a three phase generator 25 having its neutral point, 26, connected to the negative electrode 6. The three phase generator is driven by a quarter phase motor, 27, connected to the main supply, as shown. The generator 25 is not illustrated in detail, but merely diagrammatically, there being no novelty about this part of the apparatus. It is evident that in place of the three phase generator 25, a quarter phase or six phase or other suitable generator might be substituted, for keeping the negative electrode in operative condition.

The terminals of the three phase generator 25 are, respectively, connected with three supplementary positive electrodes, 28, 29, 30, while the terminals of the main source are connected with four main positive electrodes, 31, 32, 33, and 34. The work circuit has one of its sides connected with the neutral point of the main generator and its other side connected with the negative electrode 6.

Figure 4:
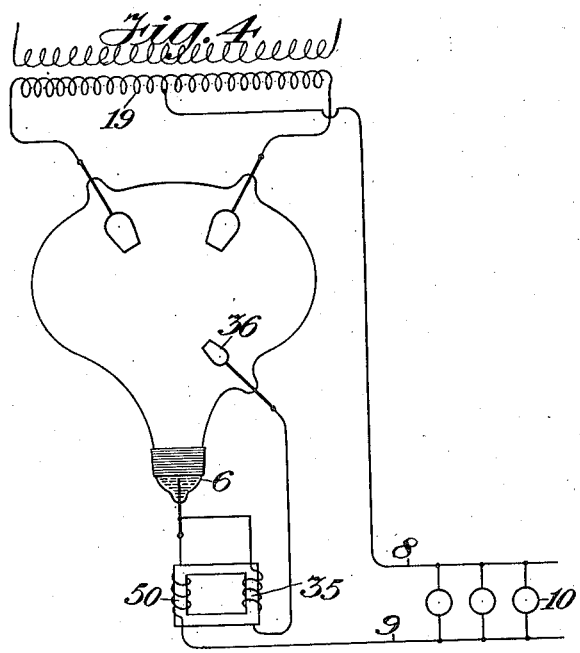

In Fig. 4, current is supplied to the work circuit 8, 9 by a method which is analogous to that illustrated in Fig. 2. In the organization shown in Fig. 4, however, the negative electrode is maintained in operative condition during the periods at which there is no natural flow through the converter by means of a second winding, 35, placed on the same core with a choke coil 50 in the main work circuit; so that as current naturally falls in the coil 50, an electro-motive-force is produced in said coil in a direction tending to continue the flow of current. The consequent electro-motive-force in the winding 35 acts upon a circuit including a supplementary positive electrode, 36, in the converter so as to pass current through a portion of the converter in the proper direction to maintain the negative electrode operative. By properly proportioning the coils 50 and 35 the current supplied by the coil 35 will continue until the alternating current supply furnished by the source 19 again causes a rising current to pass through the main work circuit.

Figure 5:
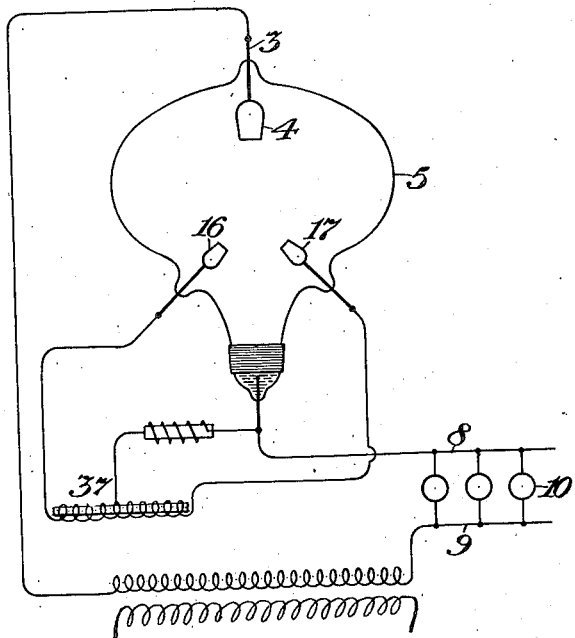

In Fig. 5, a method of operation is illustrated which is similar in some respects to that shown in Fig. 1. The independent source is here shown, however, as a secondary of a transformer, and a separate coil, 37, is used, this coil being wound on the same core with the transformer winding supplying the alternating currents.

It will be a matter of convenience to describe the combined supply and work circuits as a single circuit which may be regarded as a transmission circuit. The circuit of the independent source then becomes a second circuit as regards the transmission circuit.

In a divisional application filed by me on December 4, 1903, Serial Number 183,696, claims are made upon the apparatus described herein.

I claim as my invention—

1. In a system of electrical distribution in which currents from an alternating source are rectified for use in a direct current work circuit through the agency of a vapor electric rectifier comprising an exhausted container, a plurality of anodes and a cathode therein, the method of sustaining the activity of the cathode and maintaining the rectifier in operative condition independently of work currents, which consists in rectifying a limited quantity of energy from the source within the container independently of the work currents and passing the direct currents thus produced through the cathode of the work currents.

2. In a system of electrical distribution in which currents from an alternating source are rectified for use in a direct current work circuit through the agency of a vapor electric rectifier comprising an exhausted container, a plurality of anodes and a cathode therein, the method of sustaining the activity of the cathode and maintaining the rectifier in operative condition independently of work currents, which consists in deriving energy from a source of alternating potential, transforming this energy to produce alternating electric current which is electrically independent of the work current, rectifying the electrically independent energy so derived within the main container and passing the rectified current through the main cathode whereby this cathode is maintained in active condition.

3. In a system of electrical distribution, the combination with a vapor converter having a negative electrode and a plurality of positive electrodes, or sets of positive electrodes, of two electric circuits both connected to the negative electrode and each connected with a separate positive electrode or set of positive electrodes, one of the said circuits constituting the transmission circuit and the other being connected with an alternating source and means including said vapor converter for maintaining a continuous flow of current from said last named circuit.

4. In a system of electrical distribution, a transmission circuit including a vapor converter having a negative electrode and a plurality of positive electrodes, in combination with means for keeping the negative electrode in operative condition, such means consisting of an independent alternating current source, in combination with means for rectifying current from said last named source in the said vapor rectifier.

5. The combination with a vapor converter, of a supply circuit, and a work circuit between which the converter acts as a transmitting medium, and an independent circuit including an alternating source, the converter having a negative electrode common to the work circuit and the independent circuit, and having a plurality of positive electrodes for each of the said circuits.

6. In a system of electrical distribution, an alternating current supply circuit, a direct current work circuit, and a gas or vapor converter interposed between the said circuits, in combination with an independent alternating current circuit and means for rectifying current from both said circuits in said vapor converter.

7. In a system of electrical distribution, an alternating current source, a direct current work circuit, a gas or vapor converter interposed between the work circuit and the said source, the said converter being provided with main positive electrodes and a common negative electrode, in combination with an independent source also connected to the negative electrode and provided with a plurality of supplementary positive electrodes.

8. In a system of electrical distribution, the combination with a rectifier comprising an exhausted container, a cathode and at least one anode therein, a main alternating supply and a direct current receiving circuit therefor, of a second source of alternating current, connections from the terminals of said source to separate anodes in said container and a connection from an intermediate point of said source through an inductance to said cathode.

9. In a system of electrical distribution, the combination with a rectifier comprising an exhausted container, a cathode, at least one main anode and supplemental anodes therein, an alternating supply and a direct current receiving circuit, of means for exciting said rectifier independently of work currents therein, said means comprising a second source of alternating current connected to said supplemental anodes and at an intermediate point through an inductance to said cathode.

10. In a system of electrical distribution, the combination with a rectifier comprising an exhausted container, a cathode, at least one main anode and supplemental anodes therein, an alternating supply and a direct current receiving circuit, of means for exciting said rectifier independently of work currents therein, said means including a transformer fed from said supply and supplying energy through inductance to said rectifier by way of said supplemental anodes and said cathode.

11. In a system of electrical distribution, the combination with a rectifier comprising an exhausted container, a cathode, at least one main anode and supplemental anodes therein, an alternating supply and a direct current receiving circuit, of means for exciting said rectifier independently of work currents therein, said means consisting of means for withdrawing energy from said supply independent of the work currents and passing said energy in the form of current through said cathode and means for storing a portion of said withdrawn energy and restoring it to a circuit including said cathode at times of natural insufficiency in said withdrawn energy.

12. In a system of electrical distribution in which a direct current work circuit is fed from a rectifier comprising an exhausted container, at least one main anode and a cathode therein, means for maintaining the excitation of said rectifier at times when no current is drawn by the work circuit, said means consisting of supplemental anodes in said container and means for continuously supplying energy from said main source through said supplemental anodes to said cathode.

13. In a system of electrical distribution, the combination with a rectifier comprising an exhausted container, a cathode, a main anode therefor, and a plurality of supplemental anodes therein, an alternating supply and a direct current work circuit, of means for supplying overlapping impulses of current through said supplemental anodes to said cathode independently of current in said main anodes.

Signed at New York, in the county of New York, and State of New York, this 27th day of August, A. D. 1903.

PERCY H. THOMAS.

Witnesses:
WM. H. CAPEL,
THOS. H. BROWN, Jr.